(No Model.)
J. M. GROSS.
WIRE FENCE.
No. 540,161. Patented May 28, 1895.
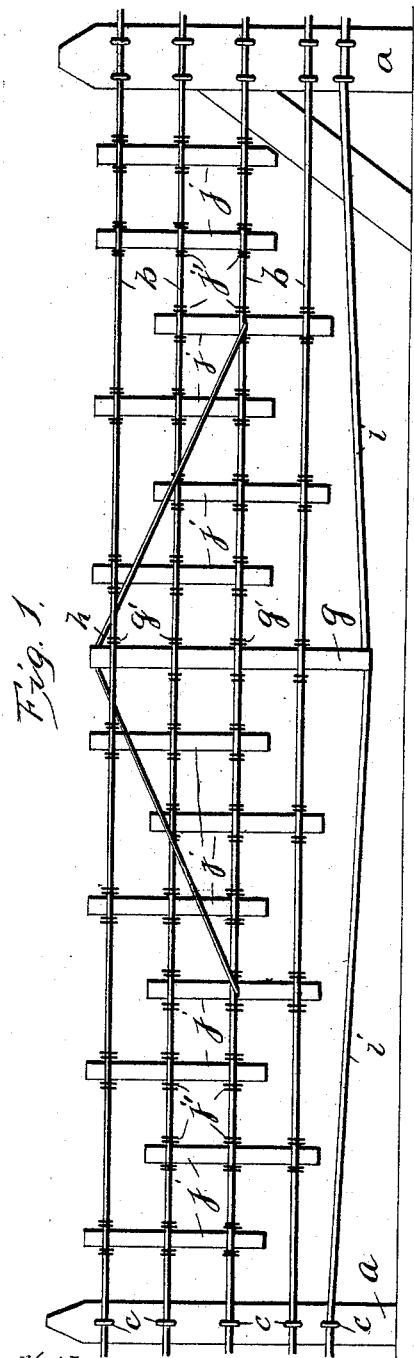
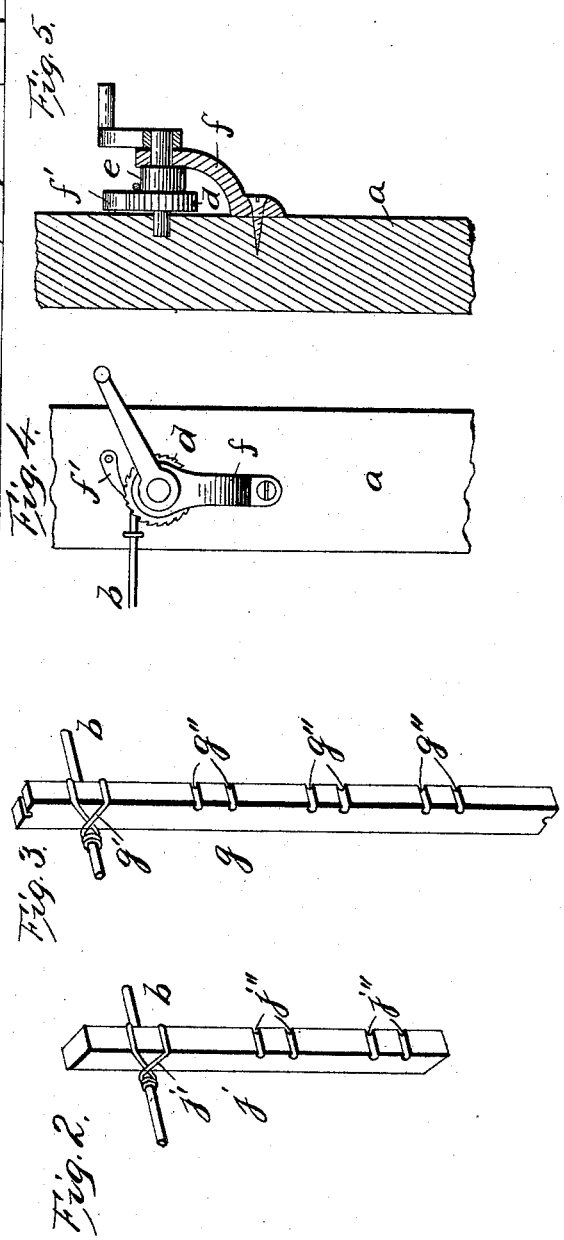
Witnesses:
E. C. Duffy
Chas. M. Werle
Inventor:
J. M. Gross
per O. E. Duffy
Attorney.

UNITED STATES PATENT OFFICE.

JOSEPH M. GROSS, OF DUBLIN, PENNSYLVANIA.

WIRE FENCE.

SPECIFICATION forming part of Letters Patent No. 540,161, dated May 28, 1895.

Application filed November 12, 1894. Serial No. 528,497. (No model.)

*To all whom it may concern:*

Be it known that I, JOSEPH M. GROSS, of Dublin, in the county of Bucks and State of Pennsylvania, have invented certain new and useful Improvements in Fences; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in fences.

The object of the invention is to provide an improved wire fence exceedingly strong and durable in construction, and yet comparatively easy and economical to build.

The invention consists in certain novel features of construction and in combinations of parts more fully described hereinafter and particularly pointed out in the claims.

Referring to the accompanying drawings, Figure 1 is a side elevation of a section of the improved fence. Fig. 2 is a detail perspective of a short picket or brace, showing one of the line-wires and the manner of securing it to the picket. Fig. 3 is a similar view of one of the long center pickets. Figs. 4 and 5 are detail views of the line-wire tighteners by means of which the line-wires are secured at the ends and tightened.

In the drawings $a$, $a$, are the strong rigid posts firmly planted suitable distances apart, to form the ends of the panels. In the present drawings the right hand post is the end post of the fence and is shown as strongly braced and carries the wire tighteners and fasteners.

Any suitable number of line wires can be employed according to the height of the fence. I here show four line wires $b$, suitably attached to all posts, but the end post, by staples or other means $c$. Each line wire is attached to the end post usually by a suitable tightener. Each tightener here shown consists of a ratchet wheel $d$, having a spool $e$, on one side for the wire and the axle or end pintles at one end turning in a socket bored in the post and at the other end passing through and journaled in the upper end of a bracket $f$, and having its outer end squared to receive a turning wrench or handle. The lower end of the bracket extends inwardly and is secured to the post.

$f'$ is a pawl for the ratchet secured to the post.

The spool has a hole to receive the wire end and thereby confine the wire to the spool so that it will be secured thereto and wound thereon when the spool is turned to tighten the wire.

Midway of each pair of rigid posts, a long picket $g$, is secured to all of the line wires. The line wires pass across one face of each picket, and each line wire is secured to the pickets by fastening wires $g'$. Each fastening wire $g'$ is at one end wrapped around the line wire and from thence passed rearwardly around the picket and in groove $g''$, in the side opposite that traversed by the line wire, and from thence passed forward around the line wire on the opposite side of the picket and from thence rearwardly around the picket again in another groove $g''$, and again wrapped around the line wire on the same side of the picket that the first wrap was made. It will thus be observed that the pickets are secured to the line wires by most strong and secure fastenings firmly holding the wires in their relative positions. The top end of each picket is notched, and a truss wire $h$ fits therein at or about its center and from thence extends downwardly and toward the rigid posts of the panel and at its opposite ends is secured to the center line wire at points midway between the long picket and the two rigid posts. By means of this top truss wire any sagging of the fence between the rigid posts and the long pickets can be easily and quickly taken up by tightening said truss wires $h$, of each panel, or any particular panel.

$i$, is a bottom truss wire really forming the sixth and bottom line wire, having an end wire tightener at the end post. This bottom truss passes beneath and fits in grooves in the lower ends of the long pickets. By means of this bottom truss all sagging of the fence panels at the center can be taken up by tightening the truss wire.

Between the long pickets and the rigid posts series of short pickets $j$, are secured to the line wires by fastening wires $j'$ and grooves $j''$ in the pickets the same as employed in connection with the long pickets. These short pickets are of a length to extend across a suitable number of the line wires so that there will be at least one line wire to which all the pickets are secured. The pickets are here shown of a length to extend across three line wires and are arranged alternately from the bottom line wire (not the bottom truss) up to the middle wire, and from the top line wire down to the middle wire. It will thus be seen that all the line wires are most strongly secured together by the arrangement of overlapping short pickets as just described.

The fence is easy to construct and repair, and can be quickly tightened up and stiffened whenever desired thereby preventing sagging and injury by cattle. It is storm proof, cattleproof, and the panels call attention to the wires and hence injury to cattle and stock is avoided.

It is evident that various slight changes might be made in the forms, constructions and arrangements of the parts described, without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. In a wire fence, a picket having a line wire passing along one face and having grooves in its opposite face and the fastening wire wrapped around the line wire and passed around the picket in a groove and wrapped around the line wire on the opposite side of the picket and then passed again around the picket in another groove and wrapped around the line wire on the same side of the picket as the first wrap.

2. The wire fence comprising the rigid posts, the line wires $b$, the bottom truss wire $i$, extending between and confined to the rigid posts, the long central picket $g$, secured to all of the line wires, and resting on the bottom truss wire, the top short truss wire $h$, resting in the top of said long picket with its ends secured to an intermediate line wire between the rigid posts and the central picket, and the short pickets $j$, between the rigid posts and the long picket and each of such length as to extend from the bottom wire up or top wire down over certain, but not all, of the line wires, so that the intermediate line wires are secured to every picket while the top and bottom wires are only secured to alternate pickets.

In testimony that I claim the foregoing as my own I affix my signature in presence of two witnesses.

JOSEPH M. GROSS.

Witnesses:
WEBSTER GRIM,
CHARLES H. RHOADES.